Oct. 18, 1960  D. P. McCONNELL  2,956,678
METHOD OF AND APPARATUS FOR ELECTROSTATICALLY SEPARATING ORE
Filed Dec. 4, 1953  6 Sheets-Sheet 3
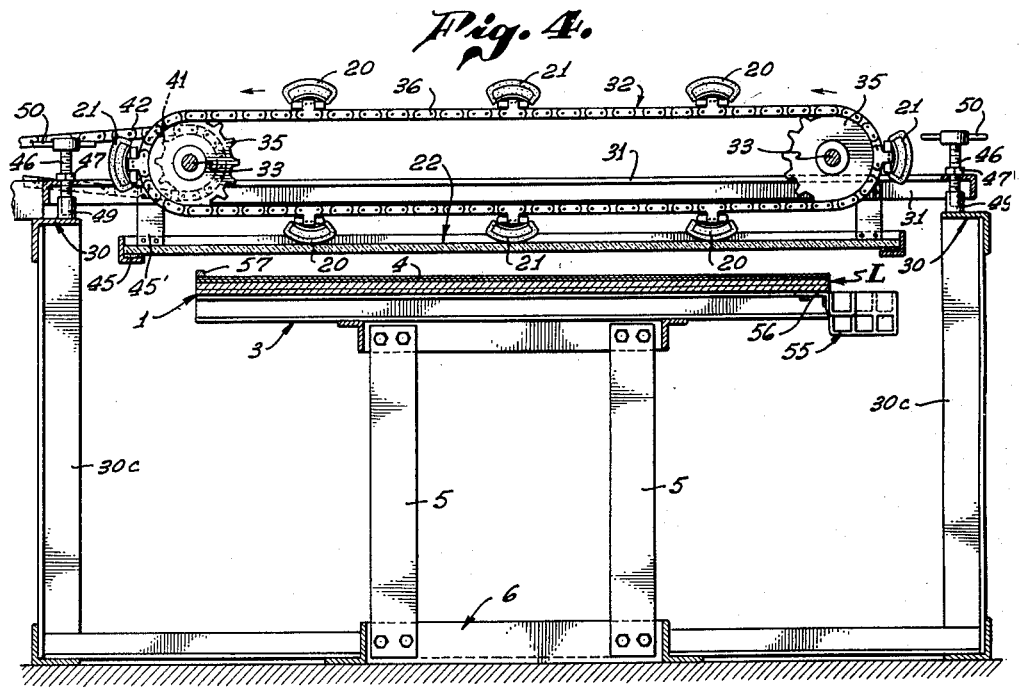
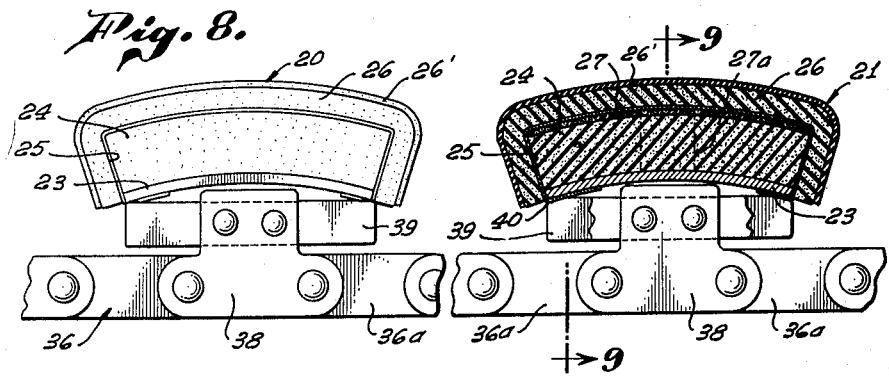
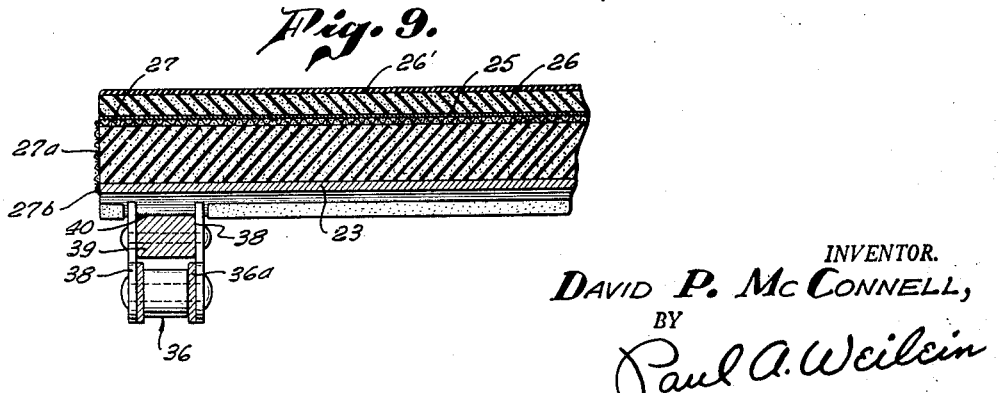
INVENTOR.
DAVID P. McCONNELL,
BY
Paul A. Weilein
ATTORNEY.

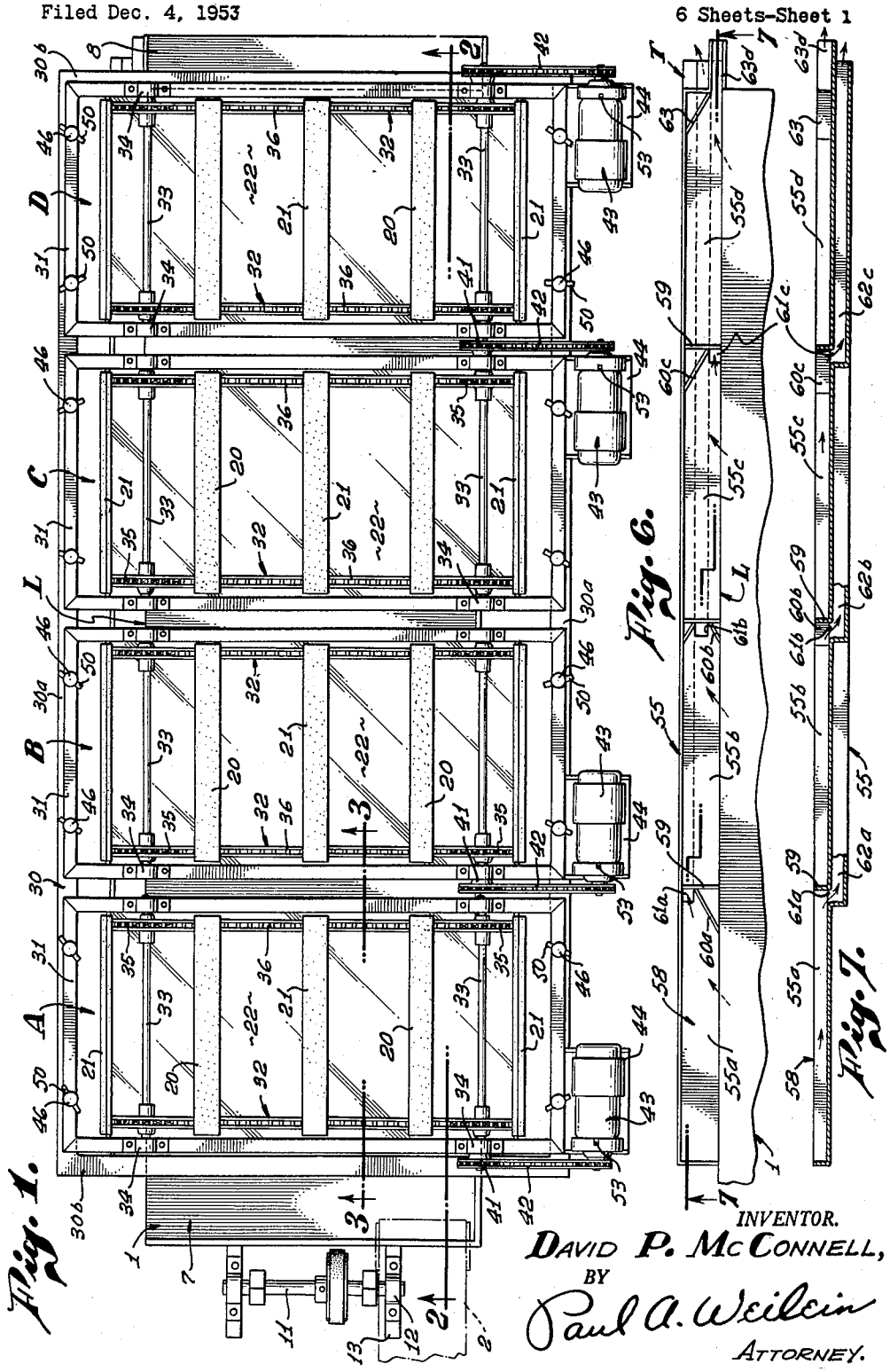

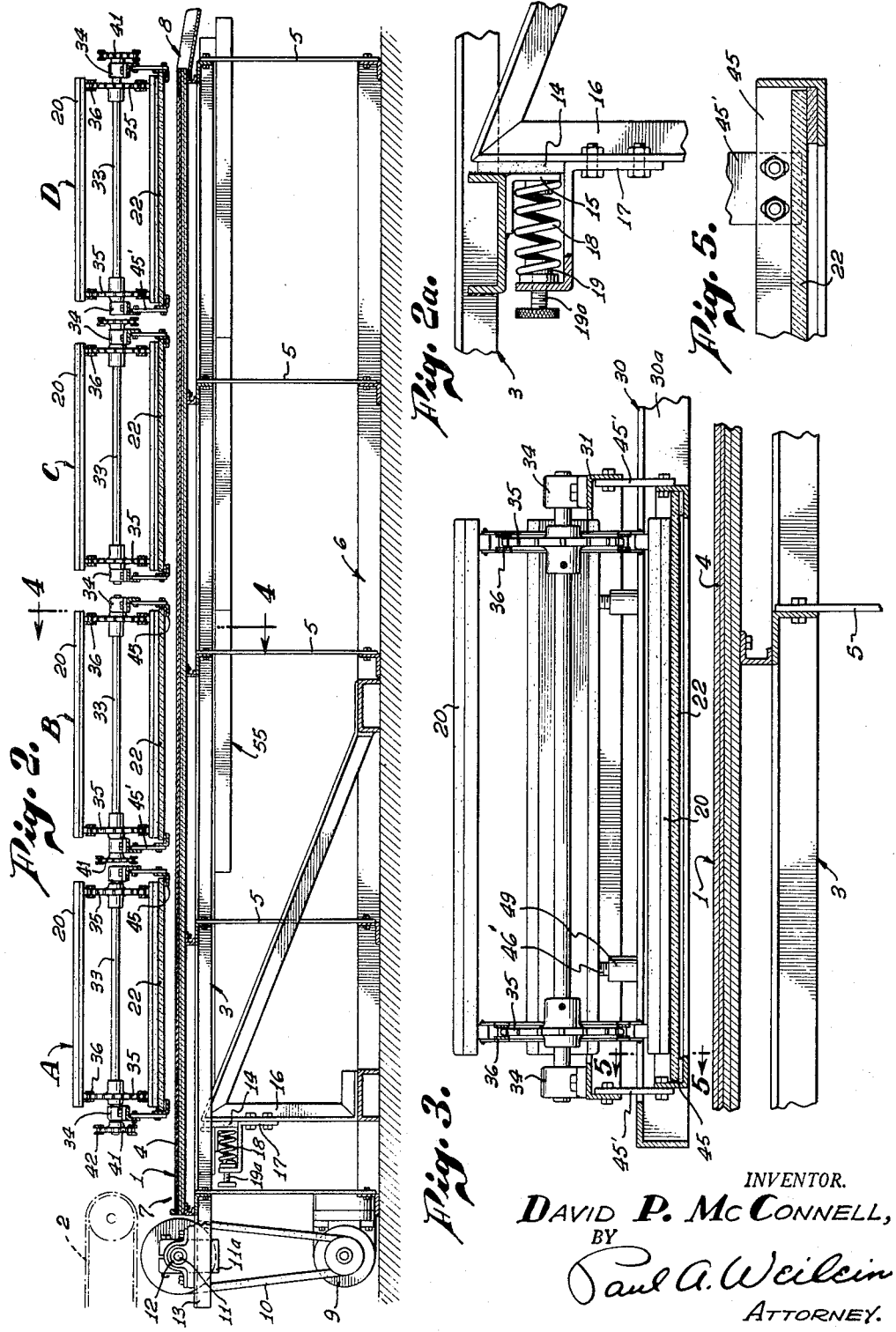

Oct. 18, 1960 D. P. McCONNELL 2,956,678
METHOD OF AND APPARATUS FOR ELECTROSTATICALLY SEPARATING ORE
Filed Dec. 4, 1953 6 Sheets-Sheet 4

INVENTOR.
DAVID P. McCONNELL,
BY
Paul A. Weilein
ATTORNEY.

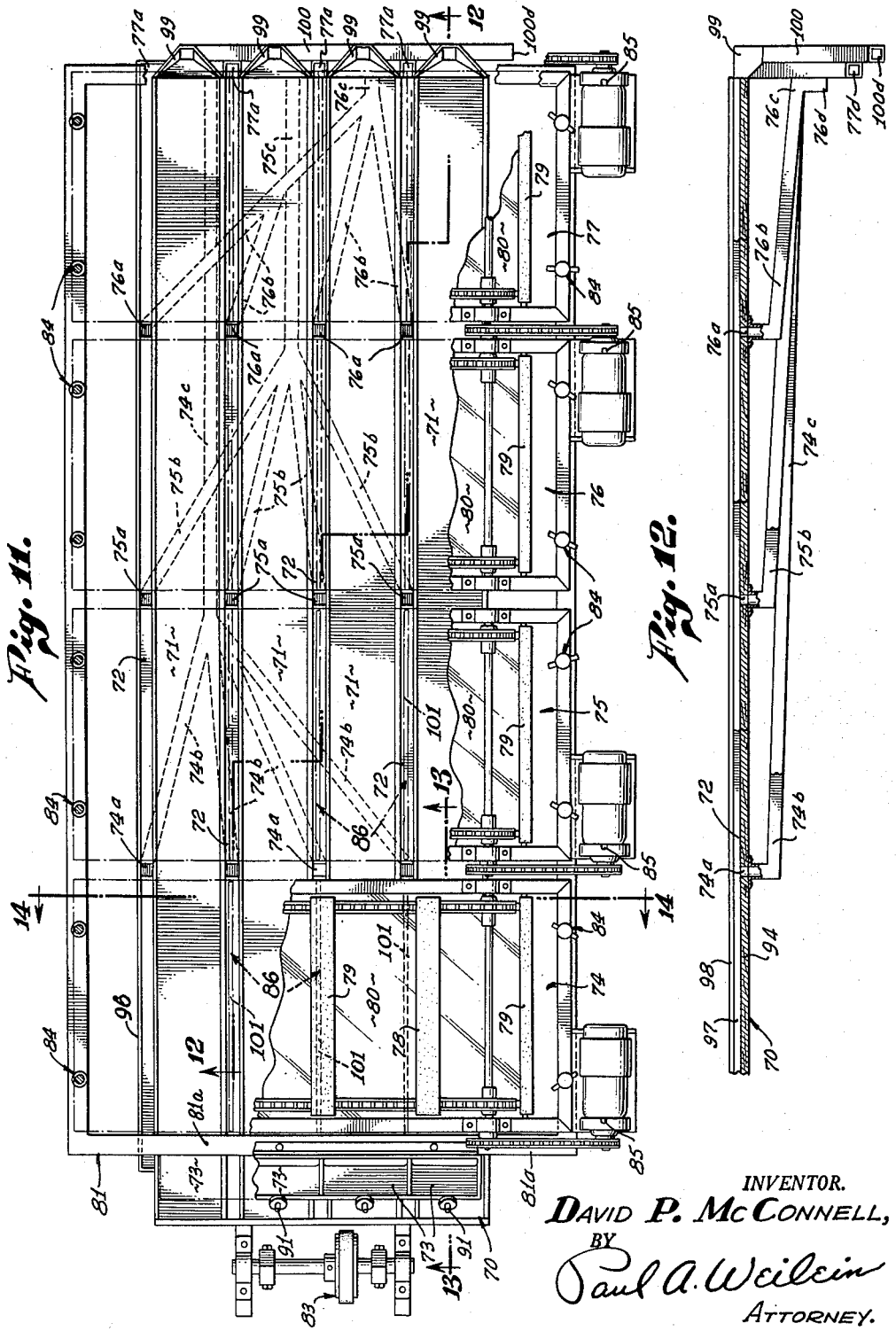

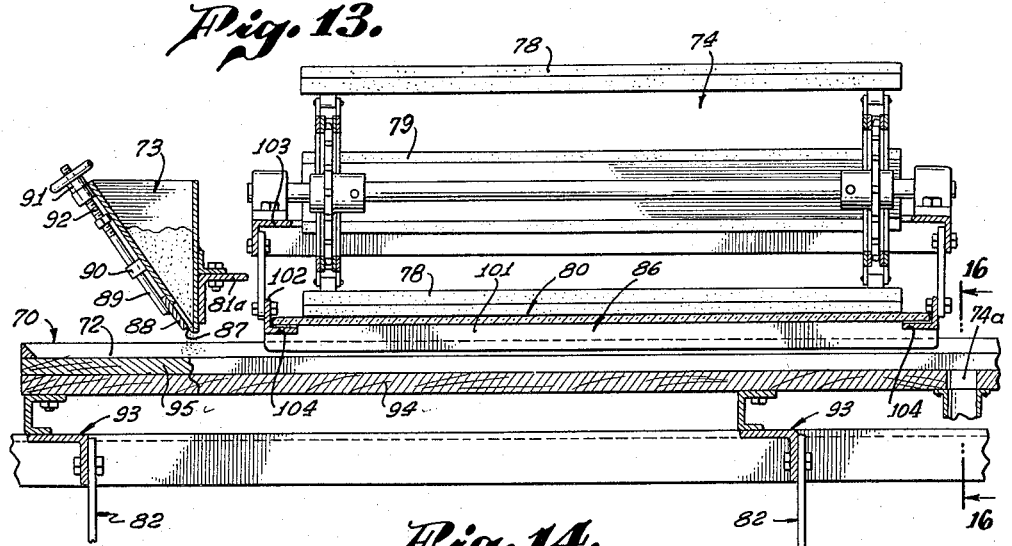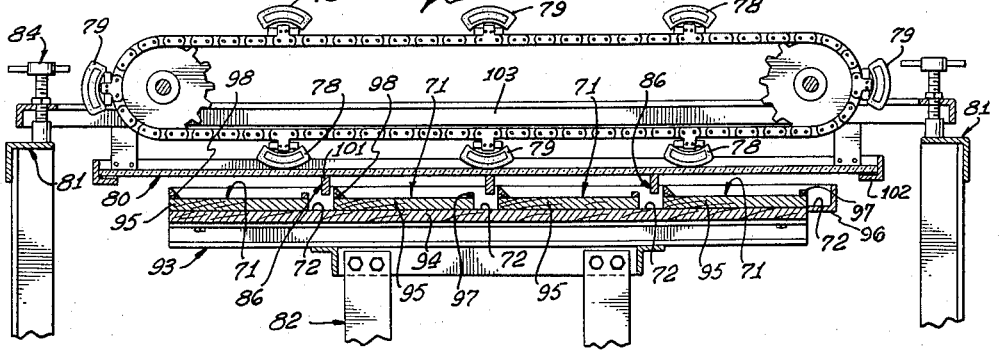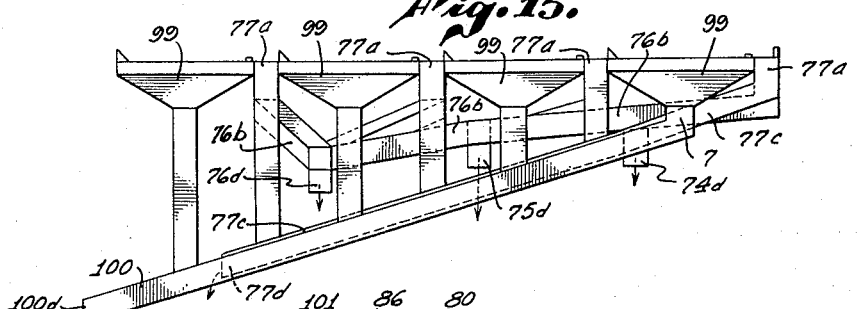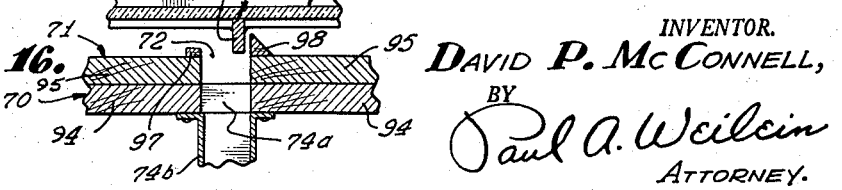

UNITED STATES PATENT OFFICE

2,956,678

METHOD OF AND APPARATUS FOR ELECTRO-STATICALLY SEPARATING ORE

David P. McConnell, Star Rte., Laws, Bishop, Calif.

Filed Dec. 4, 1953, Ser. No. 396,138

41 Claims. (Cl. 209—127)

A primary object of this invention is to provide a novel and highly efficient method of an apparatus for separating from a mass of individual particles of material, commercially valuable components thereof.

Another object is to perform such separation quickly and economically, while at the same time producing a high grade concentration of the desired components.

A further object is to be able to rely upon easily producible electric charges developed by relative movement between elements free from connection with a source of electrical energy, to effect such separation and to make possible economically feasible apparatus to attain the desired ends.

It is an important feature of the invention to apply such developed electric charges to a crushed ore so as to make fractional separations for producing high grade concentrates.

It is another object of this invention to provide apparatus and a method for economically separating from a mass of individual loose particles of ore or ore tailings or concentrates, the desired economically valuable components.

Further, it is an object hereof to provide apparatus and a method such as described for mechanically and electrically effecting a thorough separation of components of a mass of individual loose particles of material in a particularly economical manner without electrification from an extraneous source of electricity.

An additional object of this invention is to provide apparatus which may be economically operated to effectively remove from commercially valuable concentrates the penalty components which under methods of separation heretofore employed has proved difficult and costly of removal.

Other objects of the invention, and the various features of operation and construction involved, will become apparent to those skilled in the art upon reference to the following specification and the accompanying drawings wherein certain embodiments are disclosed.

Apparatus embodying this invention has been efficiently operated as an ore separator, and as here shown generally includes means operable during movement of crushed ore in a given direction on an electrically non-conductive supporting surface, for producing without the aid of an outside source of electricity, electric charges which will cause particles of the ore to be moved away from particles following the given direction.

Any suitable means may be employed for supporting and moving the crushed ore. In the apparatus above referred to, this means comprises an elongated vibratory table on which the ore is advanced while being agitated, whereby some of the particles of the ore will be discharged from an end of the table, while other particles susceptible to the electric charges will be moved so as to be discharged from a side of the table.

In accordance with this invention, the electric charges are produced by means of a member of extremely low electrical conductivity and what may be termed brushes. This member and the brushes are constructed and arranged so that upon relative movement therebetween in a direction transversely of the direction of movement of the ore or other material to be treated, the electric charges will be produced for effecting the separation hereinbefore noted.

In the present embodiments of this invention, the brushes are movable transversely of the table over plates formed of a material having extremely low electrical conductivity. These plates overlie the table in vertically spaced, spanning relation thereto. The brushes are constructed and arranged so that a succession of electric charges will be produced during such movement. The electric charges thus developed create electric fields which will move the particles of the ore susceptible thereto in the general direction of movement of the brushes, whereby such particles will be discharged from a side of the table, while the particles not susceptible to the charges will move to discharge at an end of the table.

The means for producing the electric charges may comprise a plurality of charge producing units successively disposed along the table with the brushes of each unit mounted on a power driven endless carrier arranged to rotate transversely of the associated non-conductive plate.

In each charge-producing unit are brushes embodying material constructed and arranged to render them non-conductive. Each unit also includes brushes embodying material constructed and arranged to render them conductive and to ground them to metal framing. The non-conductive and conductive brushes of each unit are spaced and related so that a conductive brush is disposed between each pair of non-conductive brushes whereby unlike brushes will be successively moved in one direction past given points transversely of the table. The non-conductive brushes are hereinafter referred to as exciting or charge producing brushes, whereas the conductive brushes are referred to as neutralizing brushes.

One control of the separating action afforded during the travel of the brushes, may be effected by varying the rate of travel of the brushes of one or more of the respective units. Thus, means are provided for moving the brushes of the several units at the same speed or at selective differential speeds per unit.

Other controls such as varying the spacing between brushes of each unit, also varying the spacing between the plates and brushes relative to the table, are provided for regulating the separation action best to effect the desired separation of the particular ore or material under the conditions at hand.

The following explanation is presented, but it is to be understood that I do not wish to be bound thereby, inasmuch as other conditions may in fact exist. According to this explanation, the brushes cause the development of electric charges at successive positions on the non-conductive plates as they move thereover.

The neutralizing brushes following the exciting or charge-producing brushes neutralize or reduce the exciting charges after such charges have performed their function. The exciting or charge-producing brushes perform their functions at each given position by reason of the fact that the electric charges generated at such positions attract and levitate those underlying particles which are susceptible to such charges within the time interval during which they are exposed to the generated charges.

As different minerals and materials subject to separation may require different periods of time to be attracted, the brushes of the different groups or stages are adapted to be operated at different speeds.

When particles are attracted by the passage of the charge-producing brushes, they are levitated and follow these brushes until out-distanced and the neutralizing brushes overtake them and neutralize or reduce the charges. Thereupon, the particles drop back to the table but at points nearer the discharge side of the table.

That a distinct time interval is required to excite and levitate a particle is apparent from the fact that the lifted, excited particles follow the exciting brush toward the discharge side of the table and do not in general appreciably move toward the exciting brush as it approaches.

The brush widths with relation to the table width and the rate of longitudinal travel imparted by the vibration of the table are such that in many instances practically all particles of a given susceptibility are discharged from the side of the table before they can be moved to the zone of the next charge-producing unit by the vibratory action. With the second charge-producing unit, the time intervals provided between the passage of the exciting brushes over a given position and the passage of its neutralizing brushes may be varied from that of the first unit to permit attraction of the particles susceptible to the particularly timed electric charges generated, whereby such particles will be lifted and successively carried to the discharge location at the side of the vibrating table. This action is repeated for each of the other particles or minerals desired, and the constituents not so recovered are delivered at the discharge end of the vibratory table.

This explanation assumes that the particles lifted by the respective brush units develop charges differing in sign from the electric charges generated by the exciting brushes so that they are attracted. For the purpose of describing somewhat more specifically the electric charges above noted, it may be stated that electric charges of varying intensity are successively produced on the non-conductive plates when the brushes pass over the plates. Thus, as the brushes advance over the plates, there are alternately created electric fields of varying intensity and duration depending upon the speed of the brushes. Some of the particles are attracted by the intense fields and carried along with them, and if not carried completely off without dropping back to the table, are carried along a short distance and fall back to the table when the intensity of the fields is reduced, and then rise again to the succeeding intense electric fields, follow and drop until the side edge of the table is reached where they drop into a discharge conveyor or collector.

With respect to the foregoing explanation, the period of time during which a particle of a particular substance must be subjected to an electric field or, in other words, to the influence of an electric charge in order to condition the particle for levitation by the field, or in other words for attraction to the electric charge producing the field, will, for purpose of identification, be hereinafter referred to in the specification and appended claims as the "electro-levitation time."

An important and significant aspect of this invention is my discovery that nearly all naturally occurring substances, and in particular most mineral substances, possess a distinctive and characteristic electro-levitation time. This physical property should not be confused with other electro-responsive properties of substances, such as "dielectric capacity or opacity," "electric or electrostatic susceptibility," etc., in which the element of time is absent. On the contrary, the time element is the outstanding and most significant characteristic of the physical property in question.

It is not intended to imply from the foregoing explanation that the electro-levitation time of a particular substance is a constant value under all circumstances and conditions. In fact, experiments have shown that this is not the case, and that this property of a particular substance is influenced by and varies in magnitude according to such factors as, among others, electrical properties of other substances with which the particular substance is associated or admixed, the moisture content of the admixture as affected by the humidity of the ambient atmosphere, and the extent of previous exposure of the substance to an electric field and the intervening conditions.

It will be understood that the aforesaid definition of the term "electro-levitation time" refers to the observable manifestations of this property as hereinabove defined, and no attempt is made herein to explain the nuclear or the electronic phenomena involved, inasmuch as an accurate description, explanation and description of such phenomena are not essential to an understanding of the instant invention. Hence this term is used herein in a descriptive and definitive, rather than a limiting, sense, and is intended to encompass any and all concepts and theories of the relative time intervals or periods required to cause a particle of a particular substance to react to and be levitated by an electric field.

Referring to the drawings:

Fig. 1 is a top plan view of apparatus embodying the present invention;

Fig. 2 is a longitudinal sectional view taken on the line 2—2 of Fig. 1;

Fig. 2a is a side elevation, partly in section, of the means for arresting motion of the table;

Fig. 3 is a fragmentary sectional view, on an enlarged scale, taken substantially on the line 3—3 of Fig. 1;

Fig. 4 is a cross sectional view taken on the plane of line 4—4 of Fig. 2;

Fig. 5 is a fragmentary detail sectional view taken substantially on the line 5—5 of Fig. 3;

Fig. 6 is a fragmentary top plan view of the take-off chute on the discharge side of the vibratory table;

Fig. 7 is a sectional view taken on the line 7—7 of Fig. 6;

Fig. 8 is an enlarged fragmentary view showing one of the brushes in end elevation and related brush in cross-section;

Fig. 9 is a fragmentary sectional view taken on the line 9—9 of Fig. 8;

Fig. 11 is a top plan view of a modified form of this invention, with parts broken away for clarity of illustration;

Fig. 12 is a longitudinal fragmentary sectional view taken substantially on the line 12—12 of Fig. 11;

Fig. 13 is a fragmentary sectional view, on an enlarged scale, taken substantially on the line 13—13 of Fig. 11;

Fig. 14 is a cross sectional view taken substantially on the line 14—14 of Fig. 11;

Fig. 15 is an end elevational view looking toward the discharge end of the apparatus, omitting the table and associated parts, but showing the arrangement and location of the respective discharge ends of the several discharge conduits of the apparatus shown in Figs. 10 and 11, and Fig. 16 is a fragmentary sectional view taken on the line 16—16 of Fig. 13.

Figure 10:
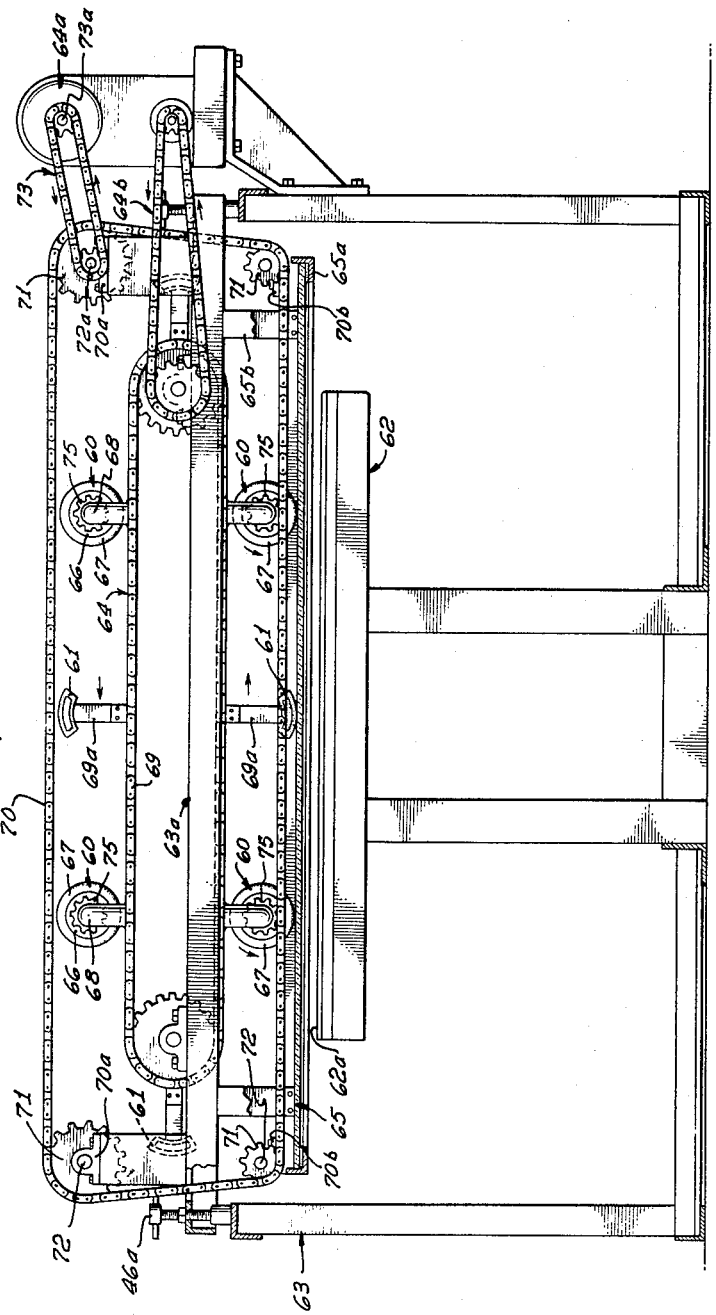
Fig. 10 is a side elevational view of a modified form of apparatus embodying the present invention.

One form of apparatus embodying the present invention includes an elongated vibratory table 1 onto one end of which is fed from a suitable conveyor 2 crushed ore or other material to be separated. The ore or material is deposited adjacent one side of the table so that the vibratory movement of the table causes the ore or material to be spread out across the table while being advanced toward an end of the table and to be agitated during such advance. During this agitation and advance of the material under treatment, electric charges are developed by the means to be hereinafter fully described. These charges will cause particles of the material which are susceptible to movement by such charges, to be levitated and moved transversely of the table for discharge at a side of the table, thereby effecting a separation of components of the material in accordance with this invention.

The table assembly may be made of any suitable material providing the ore supporting surface is non-conductive and free of any metal which would "ground out" the electric charges. For example, the table as here shown comprises a metal frame 3 having a laminated wooden top 4. The upper lamination of this top is cemented to the lower lamination, which latter is bolted to the frame 3.

To provide for vibratory movement of the table, leaf spring legs 5 are bolted to the frame 3 and to a base frame 6, which latter rests upon or may be anchored to a floor or other supporting surface capable of supporting the apparatus as a whole. These leaf spring legs are mounted with their flat sides normal to the major axis of the table, whereby the table may be vibrated with an oscillatory movement in the direction of its length.

Any suitable means may be employed for oscillating and vibrating the table in a manner causing the ore to be advanced from the feed end 7 of the table to the discharge end 8 thereof. As here shown, this means includes a motor 9 fixed to the base frame 6. A pulley and belt drive means 10 is actuated by the motor for rotating a shaft 11 eccentrically weighted as at 11a and journalled as at 12 on supporting members 13 fixed to the feed end 7 of the table. With this arrangement, the shaft 11 is rotated so as to impart successive forward thrusts to the table. By resiliently impeding or arresting these thrusts, the table is caused to oscillate in a manner which will advance the ore to the discharge end 8. In the present instance (see Fig. 2a), this impeding means includes a resilient rubber member 14 interposed between a transverse bumper member 15 secured to table 3 and a stationary frame or bracket 16 beneath the table. A member 17 fixed on the frame 16 supports the rubber member 14 between the bumper member 15 and the frame 16. The member 17 also supports a compression spring 18 with one end of the spring abutting the bumper member 15. This spring will be compressed on the rebound of the table following the striking of the member 15 against the rubber member 14. The other end of the spring is engaged with a keeper 19 carried by a screw 19a adjustably mounted on the member 17, whereby the force of the spring may be varied according to the extent of the vibratory action desired.

Electric charge producing means provided in accordance with this invention, includes what may be termed non-conductive brushes 20 and conductive brushes 21 arranged to be moved transversely in wiping contact with plates 22 of material of such low electrical conductivity as to be termed non-conductive. These plates are mounted between the brushes and the table top in vertically spaced relation to the table top. While plates 22 made of Plexiglas has produced excellent results, plates made of vinyl, Bakelite or other suitable material which is non-conductive in the sense above noted may be used. The plates 22 may be transparent whereby the separation action may be more readily observed by the operator of the apparatus.

It has been found that when the brushes 20 and 21 are arranged alternately with a conductive brush between each pair of non-conductive brushes, movement of this series transversely over the plates 22 while the crushed ore is present beneath the path of movement of the brushes, will cause electric charges to be developed which will levitate and move some of the particles of ore transversely of the table so as to be discharged from a side of the table.

Each of the brushes 20 and 21 includes, as shown in Fig. 8, an elongated plate-like steel base member 23 which is curved somewhat in cross section and has a comparatively thick sponge rubber strip 24 cemented to the convex side thereof. Embracing the strip 24 is a canvas or similar fabric strip 25 secured to the underside of the base so as to be stretched tightly over the rubber strip. A foam rubber strip 26 is cemented to the canvas strip 25. A wear strip 26' of thin soft rubber may be cemented to the outer surfaces of the strip 26. The strips 24, 25, 26 and 26' follow the contour of the convex side of the base member 23, whereby the outer surface of the brush is convex with rounded longitudinal edges. The canvas strip holds the outer strips against bunching while the brush is wiped over the non-conductive plate 22. The soft rubber strip 26, or the strip 26' if used will not scratch or cause undue wear of the plate 22 and may be easily replaced when worn.

Each of the conductive brushes 21 differs as to construction from the non-conductive brushes only in the inclusion of conductive material. As here shown (see Fig. 8), each of the conductive brushes is provided with a conductive grounding member 27 in the form of a copper wire screen mounted between the canvas strip 25 and the rubber strip 24. A reduced end portion 27a of the conductive grounding member 27 is grounded, as at 27b, to the metal base member 23, which latter is grounded to framing of the apparatus.

In the present embodiment of this invention, there are four charge-producing or brush units designated A, B, C and D, arranged along the table 1. These units are individually vertically adjustably supported on a rectangular main frame 30 surrounding the table. The frame 30 includes side members 30a, end members 30b and legs 30c arranged so that the side members extend along opposite sides of the table.

Each of the charge producing units A, B, C and D, includes a rectangular frame 31 supporting an endless carrier 32, a series of the brushes 20 and 21, and one of the non-conductive plates 22. The brushes 20 and 21 are mounted alternately on the carrier so that between each pair of non-conductive brushes 20, is a grounded conductive brush 21.

Each endless carrier 32 comprises a pair of rotary shafts 33 mounted in bearings 34 on the frame 31, sprockets 35 driven by the shafts 33, and a pair of endless chains 36 driven by the sprockets. Links 36a of the chains 36, have fixed thereto pairs of brackets 38 between which are secured mounting bars 39 extending across the ends of the base members 23 of the brushes 20 and 21. These bars are welded, as at 40, to the base members 23, thereby mounting the brushes on the endless chains 36. One of the shafts 33 of each of the units A, B, C and D is driven by means of a sprocket 41 and a chain 42, which latter is driven by a motor 43. The motor 43 is fixed to a base 44, in turn fixed to a side member 30a of the frame 30. In having the motor 43 supported by the main frame 30 and connected with the sprocket 41 by the chain 42, the associated unit may be vertically adjusted relative to the table in a manner to be hereinafter described.

The non-conductive plate 22 of each of the units A, B, C and D is supported in a rectangular frame 45 suspended beneath the frame 31 by means of hanger members 45'.

Each of the units A, B, C and D is supported for vertical adjustment to vary the spacing between the plate 22 and the top 4 of the table 1. This is accomplished by means of screws 46 threadedly engaged with nuts 47 welded to the ends of the frame 31. These screws extend freely through openings in the frame 31, with their lower ends rotatably retained in sockets provided by tubular members 49 welded to the side members 30a of the frame 30. Fixed to the upper ends of the screws 46 are handles 50 to facilitate turning of the screws for adjusting the units.

The motors 43, for driving the endless carriers 32 of the units A, B, C and D, are of the variable speed type subject to selective operation at the desired speed by means of manually operable controls 53. Thus, each of the units not only may be vertically adjusted independently, but may be independently operated at selected speeds to cause the brushes to be swept across the non-conductive plate 22 at the desired rate for the purpose to be hereinafter fully described.

With reference to Fig. 4, it will be noted that the brushes 20 and 21 on the endless carriers 32, move in a counter-clockwise direction, the brushes on the lower runs of the carriers moving from left to right across the plates 22 of the respective units A, B, C and D. Accordingly, those components of the ore or other material under treatment, which are susceptible to movement responsive to the electric charges developed during such movement of the brushes, will be levitated and moved toward the side L of the table and gravitate therefrom into a classifying chute 55. This chute is secured by brackets 56 to the table as shown in Fig. 4. The other side of the table top 4 is provided with an upstanding bead or flange 57 to prevent the material being treated from dropping off that side.

By referring now to Figs. 6 and 7, it will be seen that the chute 55 comprises a main channel 58 separated by partitions 59 into four sections 55a, 55b, 55c and 55d respectively in line with the units A, B, C and D. As the chute 55 is vibrated with the table 1, it will be seen that the ore particles dropping off the side L of the table into the first three chute sections 55a, 55b and 55c will be guided by baffles 60a, 60b and 60c respectively, so as to drop through openings 61a, 61b and 61c into tubular chutes 62a, 62b and 62c extending along the under side of the main channel 58 to the discharge end T of the chute. The last section 55d also has a baffle 63 which guides the ore particles deposited therein from the unit D, into a short discharge channel 63d which projects above and somewhat beyond the discharge ends of the chutes 62a, 62b and 62c, respectively. With this arrangement, the values or particles taken off by the units A, B, C and D are separated and may be readily collected as separate values at the discharge end T of the chute 55.

OPERATION

In the operation of apparatus embodying this invention, after the motor 9 for vibrating the table and the motors 43 for rotating the endless carriers 32 of the brush units A, B, C and D have been started, a quantity of the material to be treated is fed onto the intake or feed end 7 of the table 1. This material, whether ore or some other substance subject to treatment, should be milled or otherwise comminuted to the extent that the particles of the mass are loose. Moreover, better results are obtained if the material is screened or classified so that all of the particles to be separated are more nearly of a given comparatively small size.

The quantity of the comminuted material fed onto the table and the rate of such feed should be such that the material will spread more or less uniformly in a thin layer on the table top as the material is being advanced and agitated thereon.

The quantity and rate of feed of material should be gauged according to the nature of the particular material or ore. In the case, for example, of a mica-silica ore or other material where only two substances are to be separated and the mica or one of the two components is separated by the electric charges so as to discharge at the side L of the table while the silica or other component is advanced to discharge at the end 8 of the table, the feed may range, for example, from 30 to 50 pounds per minute on a table approximately 5 feet wide and the brushes of the four units A, B, C and D may be operated at the same or different speeds according to the concentration of the recovered value that is desired.

In the case of a complex ore, for example, tungsten ores such as scheelite combined with lime, garnet, epidote and sulphides of iron, the feed should be reduced so that each of the units A, B, C and D will attract and move all of the particles of the ore for which such units are adjusted and timed as to the speed of travel of the brushes. In this separation the scheelite, which is the last of the components to be attracted, passes under all four of the brush units and is discharged at the end 8 of the table.

The speed of transverse movement of the brushes of the several units A, B, C and D is varied according to the susceptibility of the various components subject to separation movement under the influence of the electric charges developed as the brushes are advanced at different rates in the respective units.

The timing of the units A, B, C and D, that is the rate of advance of the brushes of these units across the non-conductive plates 22, may have to be varied for the recovery of a known mineral value from like ores derived from mines in different localities, due to different compositions of such ores. Consequently, the operator of the apparatus should regulate the speed of the brushes in the respective units for the particular ore according to the separation results ascertained by observation and as desired. For example, the brushes may be first run at maximum or near maximum speed, than slowed down while the table is in operation, so that each unit is timed for the particular material to be moved thereby, this being determined by observation of the separation action taking place at selected speeds.

Now assuming that a proper amount of material conditioned as hereinbefore noted, is being advanced and agitated on the table 1 while the electric charge producing units A, B, C and D are being operated to move the non-conductive and conductive brushes transversely over the non-conductive plate 22, electric charges or currents will be developed as follows:

The non-conductive, or charge producing brushes 20, in being moved over the surface of the plate 22, induce electric charges on these plates, whereas the "grounded" neutralizing brushes 21 following the non-conductive brushes reduce the intensity of these electric charges. Thus, as each non-conductive brush 20 passes a given point on the associated non-conductive plate 22, an electric charge for levitating particles of the ore is produced while the following conductive and grounded brush reduces the intensity of this charge and the next non-conductive brush again produces a levitating charge and so on. The charges, in being successively produced and diminished, will attract and release the particles of the ore susceptible thereto and create a velocity component in the direction of movement of the brushes, whereby such particles will be moved transversely and discharged at the side L of the table, while the particles not susceptible to such charges will continue to move so as to discharge at the end 8 of the table. It is now apparent that the intensity and duration of the electric charges may be varied in each of the units A, B, C and D by regulating the rate of movement of the brushes over the plates 22 of non-conductive material.

It has been found that effective electric charges may be created by mounting the brushes so that they will have a light brushing contact with the plates 22. However, the conductive ground brushes 21 may be arranged so that they will move close to the plates 22 without contact therewith.

In the case of separation of the components of a complex tungsten ore, the apparatus of this invention has produced the following results:

Four hundred pounds (400 lbs.) of tailings scheelite ($CaWO_4$) values lost from a gravity mill were treated. The assay was 0.42 of one percent. The minerals present were $CaO_3$(calcite), $R_3R_2(SiO_4)$ 3 garnet and epidote, quartz ($SiO_2$), trace of zinc sulphide, and ($CaWO_4$) (scheelite). The tailings were classified as follows. (−12+30), (−30+70), (−70+150), (−150). These classified tailings were fed successively at the rate of 20 pounds per minute onto the vibratory table 1 with the following separation results by the respective units A, B, C and D.

(1) Unit A. With brushes moving at a rate of approximately 66 per minute across the plate 22, the calcite ($CaO_3$) was moved by the electric charges transversely of the table and discharged at the side L of the table.

(2) Unit B. With the brushes moving at a rate of approximately 60 per minute, the garnet was removed by the electric charges and discharged at the side L of the table.

(3) Unit C. With the brushes moving at the rate of approximately 44 per minute, the garnet and epidote were taken off by the electric charges.

(4) Unit D. With the brushes moving at the rate of approximately 33 per minute, the quartz and zinc sulphides were taken off.

(5) The scheelite having been separated from the other components and passed under the four units, was collected at the discharge end of the table in the amount of 2.30 pounds of 60 percent $WO_3$ concentrates, which is commercial grade and a saleable product.

(6) Waste material in the tails after the operation, amounted to approximately 397.70 pounds.

Other examples of ore separation effected in accordance with this invention are as follows:

Example 1

Approximately 500 lbs. of borax ($B_2O_3$) containing a large percentage of insoluble matter (approx. 21.79%) classified to (+12) were run through the four units A, B, C and D with the following results.

(1) Unit A, operating with brushes moving at a rate of approximately 68 per minute over the plate 22, took off at the side L of the table 34.15% $B_2O_3$ and 6.45% insolubles.

(2) Unit B, with brush speed approximately 57 per minute, similarly removed 34.71% $B_2O_3$ and 6% insolubles.

(3) Unit C, with brush speed approximately 47 per minute, similarly removed. 34.93% $B_2O_3$ and 7.04% insolubles.

(4) Unit D, with brush speed approximately 37 per minute, similarly removed 33.58% $B_2O_3$ and 8% insolubles.

The tailings taken off the end of the table had a content of 73.93% insolubles. Thus, the insoluble content of the original mass was reduced from approximately 21.79% to approximately 7%.

Example 2

Approximately 500 pounds of pegamatite ore screened to (−30) and containing predominantly lepidolite, about 1 percent beryllium with approximately ½ percent calcium tungstate, aluminum silicate, quartz and iron, was run through the apparatus, with the brushes of the units A, B, C and D moving past given points in these units at the approximate rates of 60 per minute in unit A, 55 in unit B, 45 in unit C and 30 in unit D. As a result of this operation, lepidolite was taken off the side of the table by the brush unit A, beryllium was taken off the side of the table by the unit B, aluminum silicate and iron were taken off the side of the table by unit C, and quartz was taken off the side of the table by unit D. The tungsten component was delivered at the discharge end of the table as a 68% concentrate.

In this operation, it was desired to recover lepidolite and beryllium concentrates as well as the tungsten component of the original ore. Thus, commercially valuable concentrates were obtained by the run.

Example 3

In this run, approximately 10 pounds of extremely low grade carnotite ore screened to (−30) and containing uranium ($U_3O_8$), vanadium together with quartz, calcium carbonate and some iron were treated, with the unit A operated at a brush speed of approximately 68 per minute, unit B approximately 65 per minute, unit C approximately 62 per minute and unit D approximately 60 per minute. As a result of this run, vanadium and uranium were taken off the side of the table by units A, B, and C, while unit D took off the side of the table the calcium carbonate. The quartz and some iron, being the waste, came off the end of the table. The A, B and C units took off a 2.67% concentrate of uranium ($U_3O_8$), and a 0.53% concentrate of vanadium. Only .06% vanadium was found in the waste, which showed no traces of uranium. Thus, the desired values were derived by the units A, B and C.

Example 4

About 50 pounds of manganese (Mn) ore containing silica, some lime and iron, were run through the apparatus, with the units A, B, C and D operated at per minute brush speeds of approximately 62, 55, 48 and 42 respectively. Unit A took off silica, lime, and 8.26% manganese. Unit B removed silica, lime and 10.77% manganese. Unit C removed silica, lime, iron and 15.35% manganese. Unit D removed silica, iron and 19.93% of manganese. A 36.60% manganese concentrate was taken off the discharge end of the table. Thus, it will be seen that commercially valuable concentrates of manganese were taken off by unit D from the discharge end of the table.

A modified form of this invention, as shown in Fig. 10, differs from apparatus shown in Figs. 1 through 9, primarily in that the charge producing non-conductive brushes 60 are in the form of rollers arranged to rotate about their axes as they sweep transversely of the table. The conductive brushes 61 are constructed and grounded in substantially the same manner as the conductive grounded brushes 21 shown in Figs. 1–9.

In illustrating this modified form there is shown but one brush unit, it being understood however that a plurality of such units may be employed in the same manner as units A, B, C and D, shown in Figs. 1–9.

As shown in Fig. 10, this modified form includes a vibratory table 62 of the same construction as the table shown in Figs. 1–9 providing a wooden, non-conductive top 62a for supporting the ore or other material to be treated.

A rectangular main frame 63, corresponding to the frame 30 shown in Figs. 1–9, supports a vertically adjustable frame 63a which in turn supports the brush unit. The vertical adjustment of the frame 63a and the brush unit thereon is effected through the medium of adjustment means 46a.

An endless carrier 64, corresponding to the endless carriers shown in Figs. 1–9, is supported on the frame 63a and driven by a motor unit 64a and a chain and sprocket drive means 64b, the motor being supported by the main frame 63. A non-conductive plate 65 is supported in a rectangular frame 65a suspended from the frame 63a by hangers 65b in the same manner as in the form of the invention shown in Figs. 1–9.

Each rotatable brush 60 includes a core 66 covered in a manner similar to the brushes 20 in the first form of this invention with soft rubber 67 so as to be non-conductive. The ends of the brushes 60 are mounted to rotate in bearings 68 supported on the endless carrier chains 69 of the carrier 64. The conductive brushes 61 are mounted on arms 69a carried by the chains 69 and are of the same construction as the brushes 21 shown in Fig. 8.

Rotation of the non-conductive or charge producing brushes 60 as they sweep across the non-conductive plate 65 is effected in order to create electric charges for levitating those particles of the material on the table 62 which will respond to the charges and move toward the side of the table. The grounded conductive brushes 61 operate in this form of the invention in cooperation with the charge producing brushes 60, in the same manner as in the first described form to reduce the intensity of the electric charges and resultant electric fields created by the brushes 60.

As a means for rotating the brushes 60, a pair of endless chains 70, but one of which chains is shown, are mounted on sprockets 71 carried by shafts 72 and 72a supported in bearings 70a and 70b on the frames 63a and 65a respectively. The chains 70 are driven by the shaft 72a which in turn is driven by a chain and sprocket drive connection 73 with a drive sprocket 73a operated by the motor unit through gearing therein, not shown. The lower runs of the chain 70 are disposed to engage and drive sprockets 75 on the ends of the rotatable brushes 60 when these brushes on the lower runs of the carrier 64 sweep over the non-conductive plate 65, thereby rotating these brushes. As the sprocket 73a is geared in the motor unit to rotate the chains 70 in the same direction as the endless carrier chains 69 but at a greater speed, the brushes 60 will be rotated as they move transversely of the non-conductive plate 65.

Some materials or substances subject to separation in accordance with this invention may require a low speed of transverse movement of the non-conductive and conductive brushes over the non-conductive plates, yet will require an intense electric charge of greater duration than would be developed with the non-rotative charge producing brushes, in order effectively to separate components thereof. As the revolving non-conductive brushes 60 will produce an intense electric charge of greater duration when moved transversely at a low speed, it is apparent that the apparatus as shown in Fig. 10 may be used to advantage for separating components of such materials or substances.

Another modified form of this invention, as shown in Figs. 11–16, differs from that shown in Figs. 1–9 primarily in that the vibratory table 70 thereof is constructed to provide a plurality of separate surfaces or paths 71 onto which the ore or other material to be treated is fed from individual hoppers 73. Along one side of each path 71 is a discharge channel 72 for reception of particles which are separated in accordance with this invention from the ore or other material being advanced along each path.

This modified form includes brush units 74, 75, 76 and 77 arranged as are the units A, B, C and D in the first described form of this invention. The brushes 78 and 79 of these units correspond in construction and arrangement to the brushes 20 and 21 of the first described form, the brushes 78 being non-conductive while the brushes 79 are conductive and grounded. The brushes 78 and 79 are arranged to sweep in one direction over non-conductive plates 80 corresponding to the plates 22 shown in Figs. 1–10, for creating electric charges which will cause the particles susceptible thereto to move transversely of the paths 71 into the discharge channels 72.

Feeding of ore particles or other material so as to be advanced along the separate paths 71, makes it possible to effect the desired separation action with but a short transverse movement of the particles compared to amount of transverse movement of such particles required with a wide single-path table. Accordingly, this modified apparatus may be better suited for separating some ores or other materials.

Referring more specifically to the form of the invention shown in Figs. 11–16, it will be seen that it embodies a main frame 81, vibratory mounting means 82 for the table 70, and vibrating means 83 including resilient motion-arresting means (not shown), all as provided in the first described form. It also provides means 84 for vertically adjustably supporting the brush units 74, 75, 76 and 77 on the main frame, as well as variable speed drive means 85 for moving the brushes, all of which correspond to the brush unit adjusting means and the variable speed drive means shown in Figs. 1–9.

The brush units 74, 75, 76 and 77 are of the same construction as in the first described form, except for the association therewith of grounding means 86 for nullifying the electric charges or fields over the channels 72 for the purpose which will be hereinafter fully described.

As shown in Figs. 11 and 13, the individual hoppers 73 are supported on an end member 81a of the main frame so that discharge openings 87 at the lower ends thereof will deposit the ore or other material to be separated upon the adjacent ends of the respective separate surfaces or paths 71 on the tables 70.

Slide valves 88 are provided for controlling the feed of the material through the discharge openings 87 of the hoppers, being operated by means of rods 89 movable in guides 90 on the hoppers. The rods 89 are moved to open and close the valves 88 by means of hand wheels 91 adjustably mounted on screw threaded portions 92 of the rods so as to bear against one of the guides 90. The rate of feed of the ore or other material from the hoppers 73 may be regulated as desired by adjusting the valves 88.

Referring to the construction of the table 70, it will be seen that it includes a metal frame 93 supporting a member 94 of non-conductive material such as wood, forming the base of the table top. The separate surfaces or paths 71 and three of the discharge channels 72 are formed on the base member 94 by means of elongated, flat members 95 of non-conductive material such as wood, mounted on the base member in laterally spaced relation one to the other. The fourth discharge channel 72 is formed by attaching to the right hand edge (Fig. 14) of the table along the outer margin of the adjacent path 71 a channel forming member 96 of L-shaped cross section.

For the purpose of preventing the material advancing along the separate paths 74, 75, 76 and 77 from dropping off the longitudinal margins of these paths, elongated upstanding flanges or beads 97 and 98 are mounted on the upper surfaces of the path-forming members 95 along the side margins thereof. The flanges 98 (see Figs. 14 and 16) have a greater height than the flanges 97 to prevent the particles susceptible to movement by the electric charges developed in the operation of the brush units, from being moved from one of the paths 71 to the other as well as to prevent the particles from being lifted out of the respective channels 72. The lower flanges 97 permit the particles moved transversely by the electric charges to pass into the channels 72.

As a means for discharging from the channels associated with the brush units 74, 75 and 76 respectively, particles deposited in such channels, discharge openings (see Fig. 12) 74a, 75a and 76a are formed in these channels. The openings for each brush unit extend in a row across the table in the space between the adjacent brush units.

It is desired to convey to the discharge end of the table 70, and to segregate, the particles separated and deposited into the channels 72 for the brush units 74, 75 and 76. Accordingly, the four discharge openings 74a in the channels 72 associated with the brush unit 74 will discharge these particles into four conduits 74b. The upper ends of the conduits 74b are secured to the under side of the table so as to register with the openings 74a. The other ends of the conduits 74b are connected to a single conduit 74c suitably supported by the table and which terminates in a downwardly directed discharge end 74d at the discharge end of the table, thereby providing for taking off the particles separated by the brush unit 74.

Similarly, the openings 75a and 76a associated with the brush units 75 and 76 respectively, will discharge into conduits 75b and 76b leading respectively to single conduits 75c and 76c which terminate in discharge openings 75d and 76d at the discharge end of the table.

In order to discharge from the channels 72, the particles deposited therein by the brush unit 77 located at the discharge end of the table, upright conduits 77a are mounted on the discharge end of the table 70 at the terminals of the channels 72 so as to receive such particles and convey them into a single inclined conduit 77c having a discharge end 77d as shown in Figs. 12 and 15.

The particles which reach the ends of the paths 71 after having passed beneath the brush units 74, 75, 76 and 77 will drop into discharge funnels 99, thence into a take off conduit 100 having a discharge end 100d.

It should be noted that all of the conduits for conveying and taking off the separated particles may be inclined to cause gravitation of the particles toward the discharge end of the table. However, as these conduits are carried by the table and vibrated therewith, the vibratory action will aid in conveying the particles in the desired direction.

Any suitable means, not shown, may be employed for collecting the particles separately discharged through the discharge ends of the take-off conduits, thereby effectively segregating the separated particles.

The grounding means 86 hereinbefore noted, for nullifying the lifting and moving effect of the electric charges or fields as the brushes pass over the respective channels, as here shown, comprises a plurality of bars 101 of conductive material mounted between the non-conductive plates 80 and the table so that each bar, as shown in Figs. 14 and 16, is disposed directly over and in line with one of the channels 72. It has been found that the desired nullification of the electric charges or fields with resultant effective dropping of the particles in the channels 72, will take place if the bars 101 are disposed on the sides of the centers of the channels farthest removed from the associated path 71, these sides, as shown in Fig. 16, being the right hand sides of the channel.

The ends of the bars 101, as shown in Fig. 13, are welded to the metal frames 102 supporting the plates 80, these frames being connected to the main frames 103 of the brush units, thereby providing an adequate ground for the bars.

In order that the bars 101 may contact the undersides of the plates 80 as shown in Fig. 13, the ends thereof are notched as at 104 where welded to the frames 102. It should be noted that the bars 101 also serve as baffles to mechanically arrest any transverse movement of the separated particles past the related channels in the direction of movement of the brushes.

OPERATION OF APPARATUS SHOWN IN FIGS. 11-16

After starting the motors for driving the brush units 74, 75, 76 and 77, also the motor for vibrating the table 70, the slide valves 88 are opened so that the finely divided ore or other material in the hoppers 73 may gravitate through the discharge openings 78 onto the respective paths 71 of the table.

As in the first described form of this invention, the brush units are adapted to be operated at differential speeds according to the particular ore or material and the separation results desired. Thus, in order to determine the speeds at which these brush units will effect the most efficient separation, it is preferable first to operate the brushes of all of the units at top or near-top speed and then vary the speed per unit according to the separation action per unit as observed by the operator as desirable.

Another timing factor for controlling the separation action of the brush units is the rate of feed of the material onto the paths 71 from the hoppers 73. This feed rate may be regulated by adjusting the valves 88 to vary the sizes of the discharge openings 87 in the hoppers.

It has been found that a greater rate of feed onto each path 71 may be effected than with the single path table of the first described form of this invention, due to the comparatively short distance the particles are required to travel under the influence of the electric charges or fields, from the paths 71 into the channels 72.

Continuing with the description of the operation of the apparatus shown in Figs. 11-16, it is seen that as the brushes of first unit 74 move across the plate 80 while the material is being advanced on the paths 71 of the vibratory table 70, electric charges will be alternately developed and diminished in the same manner as described in connection with the form of this invention shown in Figs. 1-9. Those of the particles of the material on each path 71 under the unit 74 which are attracted by these charges will be repeatedly levitated and moved transversely from the paths 71 into the discharge channels 72 associated with these paths.

As the levitated particles are moved by the electric charges toward the channels 72 from the respective paths 71, the grounding bars 101 act to reduce the intensity of the charges so that the particles will drop into the channels. This reduction of the intensity of the charges at points adjacent and over the channels assures that no electric charge will be developed adjacent or over the channels such as would levitate therefrom particles previously deposited therein or particles being deposited therein. Moreover, the larger flanges 98 and the grounding bars 101 "overlap" to act as baffles preventing levitated particles from moving transversely out of or past the channels.

The particles deposited into the four channels 72 for the brush unit 74 will be advanced by the head motion of the vibratory table so as to gravitate through the openings 74a, thence through the conduits 74b, and 74c so as to discharge at 74d.

The other brush units 75, 76 and 77 operate in the same manner and at the same time as the unit 74, the particles separated thereby being separately taken off from the table through the repective discharge conduits therefor so as to discharge at the terminals 75d, 76d and 77d respectively of these conduits.

Each of the four brush units here shown may be timed as to brush speed to take off a particular component of the ore or material under treatment so that in some ores or material the desired value will gravitate from the discharge ends of the paths 71 into the funnels 99 thence through the conduit 100 so as to discharge at the end 100d of this conduit. With other ores or material, the desired values may be taken off the sides of the paths by one or more of the brush units while the tailings are taken off from the discharge ends of the paths 71. Examples of these different separation operations will now be given to show the approximate brush speeds and the results obtained in treating different ores with the apparatus shown in Figs. 11-16.

Example 1

Approximately 14 tons of concentrate containing 10% $WO_3$ in the form of scheelite, as well as calcite and silica, classified to (—3), were run through the apparatus with the brushes of units 74, 75, 76 and 77 running at approximate speeds of 50, 49, 46 and 40 per minute respectively, over the plates 80. The first three units 74, 75 and 76 removed calcite from the paths 71, whereas the fouth unit separated the silica, all in such proportions that a concentrate of approximately 63 percent scheelite was obtained off the discharge ends of the paths 71.

Example 2

Approximately 400 lbs. of sulphur ore containing gypsum and lime carbonate in which there was approximately 20% free sulphur, classified to approximate (—60) were run through the apparatus with approximate brush speeds of 35, 40, 48 and 58 in the brush units 74, 75, 76 and 77. The brush units 74 and 75 caused the gypsum to be removed from the paths 71 and deposited into the channels 72, while the brush units 76 and 77 likewise removed the lime carbonate. These separations were in such proportions that a concentrate of approximately 97% free sulphur was obtained at the discharge ends of the paths 71.

Example 3

About 20 pounds of carnotite ore furnished by the Atomic Energy Commission was treated with the apparatus as shown in Figs. 11–16. This ore was reduced to a classification of (−50+100) and contained predominantly $U_3O_8$, silicon, aluminum, calcium and magnesium, also approximately 20 other minerals in amounts less 1 percent each by spectrographic analysis. This ore was run through the apparatus with the brush units 74, 75, 76 and 77 moving over the plates 80 at approximate speeds of 62, 58, 46 and 46 per minute respectively. Brush unit 74 removed from the sides of the paths 71 lime and silica and 0.11% of $U_3O_8$. Brush unit 75 removed lime, silica and 0.08% $U_3O_8$. Brush unit 76 removed aluminum, magnesium, silica and 0.07% of $U_3O_8$. Brush unit 77 removed a mixture of the mineral elements together with 0.06% $U_3O_8$. The product taken off the ends of the paths 71 amounted to a 17% concentrate of $U_3O_8$. It should be noted that in this operation, particles collected on the bottom of the plates 80 and when these particles were removed after completion of the operation they were found to have a content of 0.52% $U_3O_8$.

From the foregoing description taken in connection with the accompanying drawings, the construction, uses, operation and advantages of the invention readily will be understood by those skilled in the art to which the invention relates. While the principle of operation together with the forms of the invention which are now considered the best embodiments, have been described, it is to be understood that these forms are merely illustrative and that the invention is not limited to the details described herein, but is to be accorded the full scope of the appended claims.

I claim:

1. The method of separating from one another particles of a mixture of individual loose particles, certain of which are attracted to an electric charge of shorter duration than that which will attract others of said particles, including the steps of: moving a mixture of such particles in one direction along a given path while supported on a non-conductive surface; and intermittently subjecting said particles to successive electric charges of selected duration along a path traversing said given path to move said certain particles along said traversing path while other particles are moved along said given path.

2. The method of separating from one another particles of a mixture of individual loose particles certain of which are attracted to an electric charge of shorter duration than that which will attract others of said particles, including the steps of: moving a mixture of such particles in one direction along a given path while supported on a non-conductive surface; and intermittently subjecting said particles at spaced points along a series of paths traversing said given path, to a succession of electric charges of progressively longer selected durations which will cause particles attracted respectively by said charges of progressively longer selected durations to move in one direction in said traversing paths while other particles follow said given path.

3. The method of separating from one another particles of a mixture of individual loose particles, certain of which are attracted to an electric charge of shorter duration than that which will attract others of said particles, including the steps of: moving a mixture of such particles along a given path which supported by a non-conductive surface; intermittently subjecting said particles to a series of successive electric charges of selected duration along a path traversing said given path to move said certain particles out of said given path; and intermittently subjecting said particles, in a second path traversing said given path, to a second series of electric charges each of longer duration than the first mentioned charges, for moving particles attracted by said charges of longer duration out of said given path.

4. The method of separating from one another particles of a mixture of individual loose particles, some of which are susceptible to movement relative to other particles under the influence of an electric charge of selected duration, including the steps of: moving in a first direction on a supporting surface a mixture of such particles adjacent to an electric charge-carrying element; moving a charge-generating element in contact with said charge-carrying element in a direction transverse to said first direction to generate an electric charge directly on said charge-carrying element progressively in said transverse direction moving a charge-neutralizing element along said charge-carrying element in said transverse direction to progressively neutralize said electric charge after a selected duration of said charge such that particles susceptible to a charge of said duration are displaced from said supporting surface and moved in said transverse direction while the remaining particles are moved in said first direction.

5. The method as defined in claim 4, and including the further steps of: moving in said transverse direction a second charge-generating element in contact with a second charge-carrying element disposed substantially co-planar with said first charge-carrying element and displaced therefrom in said first direction, to generate a second electric charge directly on said second charge-carrying element progressively in said transverse direction; moving a second charge-neutralizing element along said second charge-carrying element in said transverse direction to progressively neutralize said second electric charge after a selected duration of said second charge longer than that of the first mentioned charge, to displace from said supporting surface and move in said transverse direction particles susceptible to a charge of said longer duration while the remaining charges are moved in said first direction.

6. The method as defined in claim 4, wherein successive pairs of charge-generating and charge-neutralizing elements are moved along said charge-carrying element in spaced sequence to generate a series of charges of said selected duration on said charge-carrying elements said charges being separated from said other in said transverse direction by neutralized intervals.

7. The method as defined in claim 5, wherein successive pairs of second charge-generating and charge-neutralizing elements are moved along said second charge-carrying elements in spaced sequence to generate a series of charges of said longer duration on said second charge-carrying element, said charges being separated from each other in said transverse direction by neutralized intervals.

8. Apparatus for separating particles of a loose mixture, comprising: a non-conductive support; means for moving said mixture along said support in a given path; means for progressively generating in a transverse path above said mixture a series of electric charges; and means operable in predetermined timed sequence with said charge-generating means for limiting the duration of each charge to a predetermined period; whereby alternately to subject said particles and to free the same from the influence of said charges.

9. Apparatus as defined in claim 8, and including: means for progressively generating along a second transverse path above said mixture and spaced from said first transverse path a second series of electric charges; means operable in predetermined sequence with said second charge-generating means for limiting the duration of each charge of said second series to a predetermined period longer than the period of each charge of said first series.

10. Apparatus as defined in claim 9, and including means for varying the relative rates of progressive generation and limiting of the respective series of charges.

11. Apparatus for separating particles of a loose mixture, comprising: a non-conductive support; means for moving said mixture along said support in a given path; a charge-carrying element mounted above said path; a charge-generating element and means for moving the same along said charge-carrying element in a path transverse to said given path to progressively generate an electric charge on said charge-carrying element; and a charge-neutralizing element and means for moving the same along said charge-carrying element in timed sequence with said charge-generating element to progressively neutralize said charge after a predetermined time interval; whereby to activate only those particles which are susceptible to activation by said charge during said predetermined time interval and to cause such activated particles to be moved in said transverse path.

12. Apparatus for separating particles of a loose mixture, comprising: a non-conductive support; means for moving said mixture along said support in a given path; a charge-carrying element mounted above said path; a plurality of charge-generating elements and means for moving the same in spaced sequence along said charge-carrying element in a path transverse to said given path to progressively generate electric charges on said charge-carrying element; a plurality of charge-neutralizing elements alternating with said charge-generating elements; and means for moving said charge-neutralizing elements in said transverse path in timed sequence with said charge-generating elements; whereby to cause a succession of charges of predetermined duration to progress above said mixture in the direction of said transverse path.

13. Apparatus for separating particles of a loose mixture, comprising. a non-conductive support; means for moving said mixture along said support in a given path; first and second charge-carrying elements mounted above said path, said second charge-carrying element being offset from said first charge-carrying element in the direction of movement of said mixture along said path; a first and a second series of charge-generating elements and means mounting the same for movement respectively along said first and second charge-carrying elements in a direction transverse to said given path to progressively generate a first and a second series of electric charges on said charge-carrying elements; a first and a second series of charge-neutralizing elements alternating respectively with the charge-generating elements of said first and second series; means for moving said charge-neutralizing elements in timed sequence with and in the same direction as their respective charge-generating elements to neutralize the respective charges after predetermined time intervals, the time interval of said second series of charges being longer than that of said first series of charges.

14. Apparatus as defined in claim 13, and including means for varying the relative rates of movement of said first and said second series of charge-generating and charge-neutralizing elements, to variably control the respective durations of said first and said second series of charges.

15. Apparatus for separating particles of a comminuted material, including: means for moving such material along a given path; a plurality of electric charge-developing units mounted along said path of movement of said material; each of said units including: a stationary non-conductive plate extending over said path; a plurality of movable members having non-conductive surfaces for contacting said plate, means supporting said members in spaced relation one to the other for movement in one direction on said plate in a path traversing said given path; alternate of said movable members including an electrically conductive element covered by the non-conductive surfaces thereof whereby some of the movable members are conductive and the others are non-conductive; and means for moving said movable members on said plate in said traversing path.

16. Apparatus for separating particles of a comminuted material, including: means for moving such material along a given path; a plurality of electric-charge-developing units mounted along said path of movement of said material; each of said units including: a stationary non-conductive plate extending over said path; a plurality of movable members having non-conductive surfaces for contacting said plate, means supporting said members in spaced relation one to the other for movement in one direction on said plate in a path traversing said given path; alternate of said movable members including an electrically conductive element covered by the non-conductive surfaces thereof whereby some of the movable members are conductive and the others are non-conductive; means for moving said movable members on said plate in said traversing path; and means for varying the rate of movement of said members in the respective units.

17. Apparatus for separating particles of a comminuted material, including: means for moving such material along a given path; a plurality of electric charge-developing units mounted along said path of movement of said material; each of said units including; a stationary non-conductive plate extending over said path; a plurality of movable members having non-conductive surfaces for contacting said plate; means supporting said members in spaced relation one to the other for movement in one direction on said plate in a path traversing said given path; alternate movable members including an electrically conductive element covered by the non-conductive surfaces thereof whereby some of the movable members are conductive and the others are non-conductive; and means for moving said movable members on said plate in said traversing path; and means for rotating said non-conductive brushes as they are moved along said traversing path.

18. Apparatus for separating particles of a comminuted material, including: means for moving such material along a given path; a plurality of electric charge-developing units mounted along said path; each of said units including an endless carrier arranged so that one run thereof will move transversely over said path; a plate of non-conductive material spanning said path beneath said run of said carrier; a plurality of brushes mounted in spaced relation one to the other on said carrier to successively sweep over said plate; said brushes having plate-contacting surfaces of non-conductive material; alternate brushes including electrically conductive means covered by said non-conductive surfaces, and means for driving said carrier.

19. Apparatus for separating particles of a comminuted material, including: means for moving such material along a given path; a plurality of electric charge-developing units mounted along said path of movement of said material; each of said units including: an endless carrier arranged so that one run thereof will move transversely over said path; a plate of non-conductive material spanning said path beneath said run of said carrier; a plurality of brushes mounted in spaced relation one to the other on said carrier so as to successively sweep over said plate; said brushes having plate-contacting surfaces of non-conductive material; alternate brushes including electrically conductive means covered by said non-conductive surfaces; and means selectively operable for varying the rate of travel of said brushes of the respective units.

20. Apparatus for separating particles of a comminuted material, including: means for moving such material along a given path; a plurality of electric charge-developing units mounted along said path; each of said units including an endless carrier arranged so that one run thereof will move transversely over said path; a plate of non-conductive material spanning said path beneath said run of said carrier; a plurality of brushes mounted in spaced relation one to the other on said carrier to successively sweep over said plate; said brushes having plate-contacting surfaces of non-conductive material; alternate brushes including electrically conductive means covered by said non-conductive surfaces; means selectively operable for varying the rate of movement of said brushes of the respective units; and means for rotating brushes of said units as they move transversely.

21. Apparatus for separating particles of a comminuted material, including: a vibratory table for advancing said material along a given path; a plurality of electric charge producing units spanning said table; each of said units including an endless carrier having one run arranged to move transversely over the table; variable speed drive means for said carrier; a plate of non-conductive material interposed between said run of the carrier and said table, and a plurality of brushes mounted on said carrier to sweep over said plate; said brushes having plate-contacting surfaces of non-conductive material; said brushes being spaced one from the other on said carrier; alternate of said brushes embodying conductive material therein.

22. Apparatus for separating particles of a comminuted material, including: a table for advancing said material along a given path; a plurality of electric charge producing units spanning said table; each of said units including an endless carrier having one run arranged to move transversely over the table; variable speed drive means for said carrier; a plate of non-conductive material interposed between said run of the carrier and said table; and a plurality of brushes mounted on said carrier to sweep in one direction over said plate; said brushes having surfaces of non-conductive material; said brushes being spaced one from the other on said carrier; alternate of said brushes embodying conductive material therein; a metal framing for said apparatus; and means grounding said conductive material to said framing.

23. Apparatus for separating particles of a comminuted material, including: a table for advancing said material along a given path; a plurality of electric charge producing units spanning said table; each of said units including an endless carrier having one run arranged to move transversely over the table; variable speed drive means for said carrier; a plate of non-conductive material interposed between said run of the carrier and said table, and a plurality of brushes mounted on said carrier to sweep in one direction over said plate; said brushes having plate-contacting surfaces of non-conductive material; and means in each unit for adjusting said carrier and said plate to vary the spacing of said brushes and plate above said table.

24. Apparatus for separating particles of a comminuted material, including: a non-conductive support providing a plurality of spaced, parallel paths; means for moving portions of such material along said paths; a pair of elements mounted over said paths, at least one of said elements being disposed in electrically inductive relation to said paths, said elements being constructed and arranged to generate on one of said elements, responsive to relative movement therebetween, a succession of electrical charges spaced apart transversely of said paths between the lateral extremities of each of said paths for levitating and moving particles of said material from said paths; means for effecting said relative movement between said elements; means for receiving from each path the particles removed by said electric charges; and means associated with said last named means for conducting the particles therefrom to a predetermined discharge point.

25. Apparatus for separating particles of a comminuted material, including: a non-conductive support providing a plurality of spaced, parallel paths; means for moving portions of such material along said paths; a pair of elements mounted over said paths, at least one of said elements being disposed in electrically inductive relation to said paths, said elements being constructed and arranged to generate on one of said elements, responsive to relative movement therebetween, a succession of electric charges spaced apart transversely of said paths between the lateral extremities of each of said paths for levitating and moving particles of said material from said paths; means for effecting said relative movement between said elements; and means providing a discharge channel along one side of each of said paths for reception of the particles removed by said charges.

26. Apparatus for separating particles of a comminuted material, including: a non-conductive support providing a plurality of spaced, parallel paths; means for moving portions of such material along said paths; a pair of elements mounted over said paths, at least one of said elements being disposed in electrically inductive relation to said paths, said elements being constructed and arranged to generate on one of said elements, responsive to relative movement therebetween, a succession of electric charges spaced apart transversely of said paths between the lateral extremities of each of said paths for levitating and moving particles of said material from said paths; means for effecting said relative movement between said elements; and means providing a discharge channel along one side of each of said paths for reception of the particles removed by said charges; and a discharge conduit connected with each of said channels.

27. Apparatus for separating particles of a comminuted material, including: a non-conductive support providing a plurality of separate paths for advancing said material in one direction; a stationary element mounted over said paths in electrically inductive relation thereto; means movable over said stationary element transversely of said paths; said transversely movable means and said stationary element being constructed and arranged to cooperate to generate thereon a succession of electric charges spaced apart transversely of said paths between the lateral extremities of each of said paths, said charges being movable transversely of said paths for attracting and moving from said paths particles of said material which are susceptible to said charges; and means for actuating said transversely movable means to produce said electric charges.

28. Apparatus for separating particles of a comminuted material, including: a non-conductive support providing a plurality of separate paths for advancing said material in one direction; a stationary element mounted over said paths in electrically inductive relation thereto; means movable over said stationary element transversely of said paths; said transversely movable means and said stationary element being constructed and arranged to cooperate to generate thereon electric charges movable transversely of said paths for attracting and moving from said paths particles of said material which are susceptible to said charges; means for actuating said transversely movable means to produce said electric charges; and means for modifying said charges at predetermined locations relative to said paths.

29. Apparatus for separating particles of a comminuted material, including: a non-conductive support providing a plurality of spaced, parallel paths; means for moving portions of such material along said paths; a pair of elements mounted over said paths, at least one of said elements being disposed in electrically inductive relation to said paths, said elements being constructed and arranged to generate on one of said elements, responsive to relative movement therebetween, a succession of electric charges spaced apart transversely of said paths between the lateral extremities of each of said paths for levitating and moving particles of said material from said paths; means for effecting said relative movement between said elements; means providing a discharge channel along one side of each of said paths for reception of the particles removed by said charges; a discharge conduit connected with each of said channels, for conveying said particles therefrom; and means adjacent each channel for nullifying said electric charges to prevent particles susceptible to said charges from moving past each channel.

30. Apparatus for separating particles of a comminuted material including: a non-conductive support providing a plurality of separate paths along which said material is movable; a stationary element mounted over said paths; means movable over said stationary element transversely of said paths and which in cooperation with said element will produce a succession of electric charges for levitating and moving from the paths particles susceptible to such charges; means for so moving said transversely movable means; and means between said stationary element and said support and extending longitudinally between said paths for reducing said electric charges.

31. Apparatus for separating particles of comminuted material, including: means for advancing said material in one direction along separate longitudinal paths; and a plurality of electric charge-producing units mounted in longitudinally spaced relation one to the other over said paths; each of said units including a stationary element above said paths, means arranged to move over said element transversely of said paths, and means for so moving said last named means; said element and said transversely movable means of each unit being constructed and arranged to develop between the lateral extremities of each of said paths, as a result of said transverse movement, a succession of electric charges advancing transversely above said paths in transversely spaced relation and which will attract and move particles of said material from said paths; and means providing along one side of each of said paths a discharge channel for reception of the particles removed therefrom by said charges; said channels having openings through which said particles are discharged.

32. Apparatus for separating particles of a comminuted material, including: a vibratory table having a plurality of longitudinal paths separated by longitudinal channels; said paths adapted to advance said material in one direction; upstanding members extending along margins of said paths; a stationary element disposed over said table; means movable over said stationary element transversely of said paths; means for so moving said last named means; said stationary element and said transversely movable means being constructed and arranged to produce responsive to said transverse movement a succession of electric charges across said paths for levitating particles of said material over said upstanding members into said channels.

33. Apparatus for separating particles of a comminuted material, including: a vibratory table having a plurality of longitudinal paths separated by longitudinal channels; said paths adapted to advance said material in one direction; upstanding members extending along margins of said paths; a stationary element disposed over said table; means movable over said stationary element transversely of said paths; means for so moving said last named means; said stationary element and said transversely movable means being constructed and arranged to produce responsive to said transverse movement a succession of electric charges across said paths for levitating particles of said material over said upstanding members and into said channels; and means for electrically nullifying said charges at locations adjacent said channels to prevent levitation of particles from said channels.

34. Apparatus for separating particles of a comminuted material, including: a vibratory table having a plurality of longitudinal paths separated by longitudinal channels; said paths adapted to advance said material in one direction; upstanding members extending along margins of said paths; and a plurality of electric charge-producing units longitudinally spaced one from the other along said table; each of said units including: a plate of non-conductive material overlying said paths; an endless carrier mounted over said plate for rotation in one direction transversely of said paths; and a plurality of members mounted on said carrier so as to successively move transversely over said plate; said members being constructed and arranged to produce in cooperation with said plate a succession of electric charges moving across said paths responsive to said transverse movement; said charges causing particles of said material to be lifted and moved off said paths into said channels.

35. Apparatus for separating particles of a comminuted material, including: a vibratory table having a plurality of longitudinal paths separated by longitudinal channels; said paths adapted to advance said material in one direction; upstanding members extending along margins of said paths for preventing particles of said material from being moved off said paths by the vibration of said table; and a plurality of electric charge-producing units longitudinally spaced one from the other along said table; each of said units including; a plate of non-conductive material overlying said paths; an endless carrier mounted over said plate for rotation in one direction transversely of said paths; and a plurality of members mounted on said carrier so as to successively move transversely over said plate; said members having non-conductive surfaces of a different material than that of said plate and adapted to contact said plate during said movement of said members; alternate of said members having conductive material embodied therein beneath the non-conductive surfaces thereof; said movement of said members relative to said plate producing electric charges extending across said paths for levitating particles of said material and moving such particles into said channels.

36. Apparatus for separating particles of a comminuted material, including: a vibratory table having a plurality of longitudinal paths separated by longitudinal channels; said paths adapted to advance said material in one direction; upstanding members extending along margins of said paths; and a plurality of electric charge-producing units longitudinally spaced one from the other along said table; each of said units including: a plate of non-conductive material overlying said paths; an endless carrier mounted over said plate for rotation in one direction transversely of said paths; a plurality of members mounted on said carrier so as to successively move transversely over said plate; said members having non-conductive surfaces of a different material than that of said plate and adapted to contact said plate during said movement of said members; alternate of said members having conductive material embodied therein beneath the non-conductive surfaces thereof; said movement of said members relative to said plate producing electric charges extending across said paths for levitating particles of said material and moving such particles into said channels; and elongated electrically grounded members of conductive material on the plate of each of said units extending longitudinally bettween said paths over said channels.

37. Apparatus for separating particles of a comminuted material, including: means for moving such material along a given path; an electric charge-developing unit mounted over said path; said unit including a non-conductive member over said path; a plurality of movable members having surfaces for contacting said non-conductive member; means supporting said movable members for movement on said non-conductive member in a path traversing said given path; alternate of said movable members including an electrically grounded conductive element; and means for moving said movable members on said non-conductive member in said traversing path.

38. Apparatus for separating particles of a comminuted material, including: means for moving such material along a given path; an endless carrier arranged so that one run thereof will move transversely over said path; a plate of non-conductive material spanning said path beneath said run; a plurality of brushes mounted on said carrier to successively sweep over said plate; said brushes having plate-contacting surfaces of non-conductive material; alternate brushes including electrically grounded conductive means covered by said non-conductive material; and means for driving said carrier.

39. Apparatus for separating particles of a comminuted material, including: means for moving such material along a given path; a plurality of electric charge-developing units mounted along said paths; each of said units including an endless carrier arranged so that one run thereof will move transversely over said path; a plate of non-conductive material spanning said path beneath said run; a plurality of brushes mounted in spaced relation one to the other on said carrier so as to successively sweep over said plate; said brushes having plate-contacting surfaces of non-conductive material; alternate brushes including electrically grounded conductive means covered by said non-conductive material; and means selectively operable for varying the rate of travel of said brushes of the respective units.

40. Apparatus for separating particles of a comminuted material, comprising: a non-conducting surface providing a path for said material; means for moving said material along said path; a pair of elements mounted over said path, at least one of said elements being disposed in electrically inductive relation to said path, said elements being constructed and arranged to cooperatively generate on one of said elements, responsive to relative movement therebetween, a succession of electric charges spaced apart transversely of said path between the lateral extremities of said path, for levitating and moving particles of said material from said path; means for effecting relative movement between said elements; and means for receiving the particles removed from said path.

41. Apparatus for separating particles of a comminuted material, comprising: a non-conductive support providing a path for advancing said material in one direction; a stationary element mounted over said path in electrically inductive relation thereto; means movable across said stationary element transversely of said path; said transversely movable means and said stationary element being constructed and arranged to cooperatively generate on said stationary element a succession of electric charges spaced apart transversely of said path between the lateral extremities of said path, said charges moving transversely of said path to attract and move from said path particles of said material which are susceptible to attraction by said charges; and means for actuating said transversely movable means to produce said charges.

References Cited in the file of this patent

UNITED STATES PATENTS

| | | |
|---|---|---|
| 254,038 | Osborne | Feb. 21, 1882 |
| 254,039 | Osborne | Feb. 21, 1882 |
| 1,017,701 | Sutton et al. | Feb. 20, 1912 |
| 1,020,063 | Sutton et al. | Mar. 12, 1912 |
| 1,073,645 | Sutton et al. | Sept. 23, 1913 |
| 1,375,741 | Sutton et al. | Apr. 26, 1921 |

FOREIGN PATENTS

| | | |
|---|---|---|
| 263,190 | Switzerland | Aug. 31, 1949 |

UNITED STATES PATENT OFFICE

CERTIFICATION OF CORRECTION

October 18, 1960

Patent No. 2,956,678

David P. McConnell

It is hereby certified that error appears in the above numbered patent requiring correction and that the said Letters Patent should read as corrected below.

Column 16, line 38, for "from said" read -- from each --.

Signed and sealed this 2nd day of May 1961.

(SEAL)
Attest:

ERNEST W. SWIDER
Attesting Officer

DAVID L. LADD
Commissioner of Patents